United States Patent
Kim et al.

(10) Patent No.: US 9,171,105 B2
(45) Date of Patent: Oct. 27, 2015

(54) ELECTRONIC DEVICE AND METHOD OF OPERATING THE SAME

(75) Inventors: Juhee Kim, Seoul (KR); Jungkyu Choi, Seoul (KR); Jongse Park, Seoul (KR); Joonyup Lee, Seoul (KR); Seokbok Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 258 days.

(21) Appl. No.: 13/302,822

(22) Filed: Nov. 22, 2011

(65) Prior Publication Data

US 2013/0132964 A1    May 23, 2013

(51) Int. Cl.
G06F 9/46   (2006.01)
G06F 7/00   (2006.01)
G06F 17/30  (2006.01)
G06F 9/48   (2006.01)

(52) U.S. Cl.
CPC ........ *G06F 17/30997* (2013.01); *G06F 9/4843* (2013.01); *G06F 9/465* (2013.01); *G06F 17/30864* (2013.01); *G06F 2209/482* (2013.01)

(58) Field of Classification Search
CPC .. G06F 9/465; G06F 17/30864; G06F 9/4887
USPC .......................................................... 718/102
See application file for complete search history.

(56) References Cited

U.S. PATENT DOCUMENTS

| | | | |
|---|---|---|---|
| 8,185,582 B2 * | 5/2012 | Yamagiwa et al. | 709/203 |
| 2002/0144261 A1 * | 10/2002 | Schwalb et al. | 725/32 |
| 2003/0167307 A1 * | 9/2003 | Filepp et al. | 709/205 |
| 2004/0019499 A1 * | 1/2004 | Murashita | 705/1 |
| 2008/0013501 A1 * | 1/2008 | Keshavarzian et al. | 370/338 |
| 2008/0115016 A1 | 5/2008 | Choi et al. | |
| 2008/0133449 A1 * | 6/2008 | Richardson et al. | 707/1 |

FOREIGN PATENT DOCUMENTS

| | | |
|---|---|---|
| KR | 10-0159725 B2 | 8/1998 |
| KR | 10-0196394 B1 | 2/1999 |
| KR | 10-0509455 B1 | 8/2005 |

* cited by examiner

*Primary Examiner* — Camquy Truong
(74) *Attorney, Agent, or Firm* — Birch, Stewart, Kolasch & Birch, LLP

(57) ABSTRACT

An electronic device and a method of operating the same are provided. More particularly, in an electronic device and a method of operating the same, by recognizing a keyword of contents, reflecting the contents, and executing an application corresponding to the recognized keyword, an application execution environment corresponding to a user intention is provided.

18 Claims, 20 Drawing Sheets

Relation DB between keyword and application

FIG.3

Keyword DB

| Classification of keyword | Example |
|---|---|
| Location | Time Square, Namhyeon-dong, Gwanak-gu, Seoul ⋮ |
| Time | 5:00PM, afternoon, morning ⋮ |
| Meeting | Let's meet, let's see ⋮ |
| Feeling | Groom, happiness ⋮ |
| Electronic device | Air conditioner, refrigerator ⋮ |
| Phone number | 051-254-8487 oh-five-one-four-three-five-two-four-seven-seven ⋮ |
| A/V contents | Transformer 3 ⋮ |
| Other | Account number ⋮ |

| Text-based contents | Non-text based contents |
|---|---|
| Web page | Audio(e.g. communication) |
| Message | Image |
| Mail | A/V contents |
| E-book | |
| ⋮ | ⋮ |

| Acquired keyword | 17:00PM |
|---|---|
| Corresponding application | Schedule management application |

| Acquired keyword | Time Square, 17:00PM | |
|---|---|---|
| Corresponding application | Time Square | Schedule management application |
| | | Address book application |
| | | Map application |
| | 17:00PM | Schedule management application |
| Priority order in consideration of user intention | Schedule management application (2) | |
| | Address book application (1), Map application (1) | |

<E-mail contents>

ELECTRONIC DEVICE AND METHOD OF OPERATING THE SAME

BACKGROUND

1. Field

This document relates to an electronic device and a method of operating the same, and more particularly, to an electronic device and a method of operating the same that can recognize a keyword of contents, reflect the contents, and execute an application corresponding to a recognized keyword.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

A terminal as a multimedia player can be referred to as a display device since it generally has a function of displaying video information.

Terminals can be divided into a mobile terminal and a stationary terminal. Examples of the mobile terminal can include laptop computers, cellular phones, etc. and examples of the stationary terminal can include television systems, monitor for desktop computers, etc.

SUMMARY

An aspect of this document is to provide an electronic device and a method of operating the same that can acquire contents, recognize a keyword of the acquired contents, apply the acquired contents to an application corresponding to the keyword among a plurality of applications, and execute the application corresponding to the keyword.

Another aspect of this document is to provide an electronic device and its operation method, which address the limitations and disadvantages associated with the related art.

This document is not limited to the above-described objects and the other objects will be understood by those skilled in the art from the following description.

In an aspect, an electronic device includes: a keyword acquisition unit; and a controller for acquiring a keyword of random contents through the keyword acquisition unit, applying the contents to an application corresponding to the acquired keyword among a plurality of applications, and executing the application corresponding to the keyword.

In another aspect, a method of operating an electronic device includes: acquiring a keyword of random contents; and applying the contents to an application corresponding to the acquired keyword among a plurality of applications and executing the application corresponding to the keyword.

In an electronic device and a method of operating the same according to this document, by acquiring a keyword of random contents and applying the contents to an application corresponding to the acquired keyword among a plurality of applications, an application environment corresponding to a user intention can be provided.

BRIEF DESCRIPTION OF THE DRAWINGS

The above and other objects and features of this document will become apparent from the following description of preferred embodiments given in conjunction with the accompanying drawings, in which:

FIG. 3 is a table illustrating a keyword database according to an exemplary embodiment of the present invention;

DETAILED DESCRIPTION OF PREFERRED EMBODIMENTS

This document will now be described more fully with reference to the accompanying drawings, in which exemplary embodiments of the present invention are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes module and unit are given to components of the mobile terminal in consideration of only facilitation of description and do not have meanings or functions discriminated from each other.

The mobile terminal described in the specification can include a cellular phone, a smart phone, a laptop computer, a digital TV or smart TV, a digital broadcasting terminal, Personal Digital Assistants (PDA), a Portable Multimedia Player (PMP), a navigation system and so on.

In addition, the mobile terminal can be referred to as an electronic device.

Figure 1:
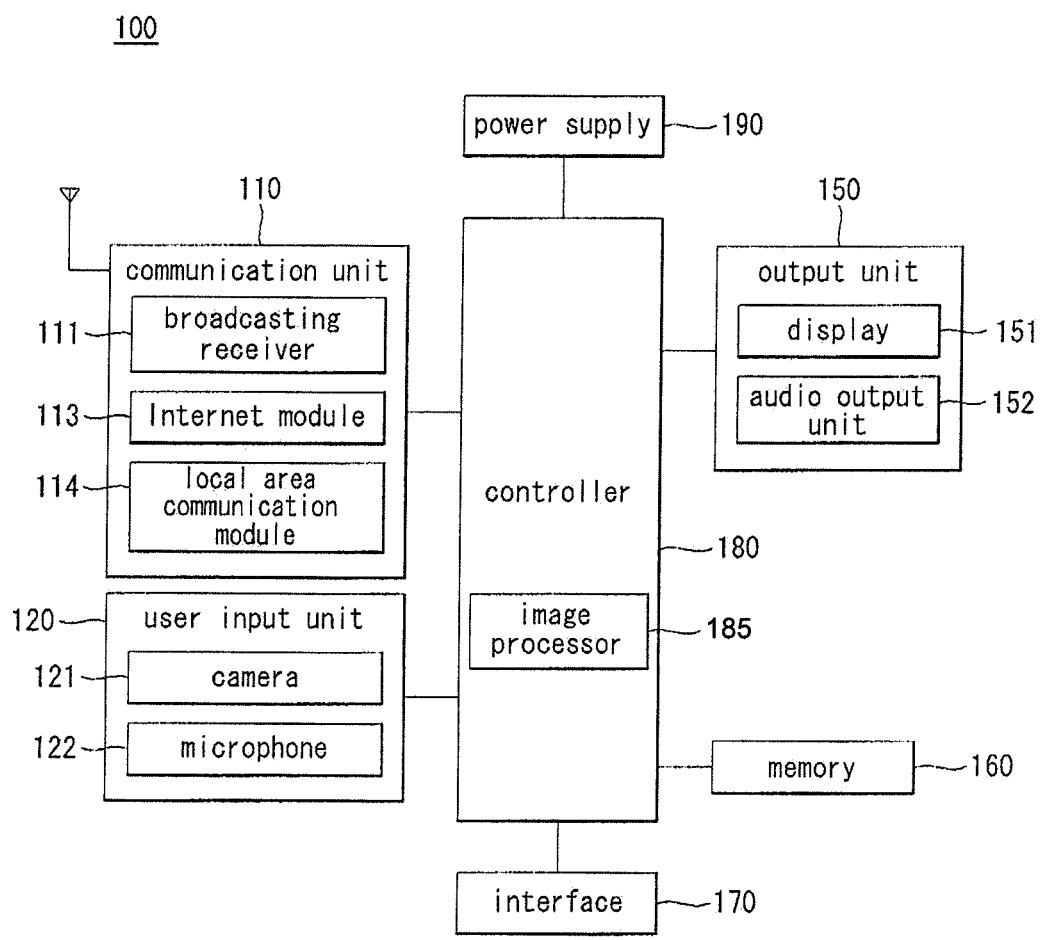
FIG. 1 is a block diagram of a display device according to an embodiment of the present invention.

FIG. 1 is a block diagram of an electronic device relating to an embodiment of this document.

As shown, the electronic device 100 may include a communication unit 110, a user input unit 120, an output unit 150, memory 160, an interface 170, a controller 180, and a power supply 190. The number of components included in the electronic device 100 may be varied.

The communication unit 110 may include at least one module that enables communication between the electronic device 100 and a communication system or between the electronic device 100 and another device. For example, the communication unit 110 may include a broadcasting receiving module 111, an Internet module 113, and a local area communication module 114.

The broadcasting receiver 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an Electronic Program Guide (EPG) of a Digital Multimedia Broadcasting (DMB) system or in the form of an Electronic Service Guide (ESG) of a Digital Video Broadcast-Handheld (DVB-H) system.

The broadcasting receiver 111 may receive broadcasting signals using various broadcasting systems. The broadcasting signals and/or broadcasting related information received through the broadcasting receiver 111 may be stored in the memory 160.

The Internet module 113 may correspond to a module for Internet access and may be included in the electronic device 100 or may be externally attached to the electronic device 100.

The local area communication module 114 may correspond to a module for near field communication. Furthermore, Bluetooth, Radio Frequency Identification (RFID), Infrared Data Association (IrDA), Ultra WideBand (UWB) and/or ZigBee may be used as a near field communication technique.

The user input unit 120 is used to input a user input, an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The electronic device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the electronic device 100. The display 151 may display a User Interface (UI) or a Graphic User Interface (GUI) relating to the electronic device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The electronic device 100 may include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter, referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When a user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the communication unit 110 or stored in the memory 160. The audio output module 152 may output audio signals related to functions, such as a call signal incoming tone and a message incoming tone, performed in the electronic device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, Random Access Memory (RAM), Static RAM (SRAM), Read-Only Memory (ROM), Electrically Erasable Programmable ROM (EEPROM), Programmable ROM (PROM), magnetic memory, magnetic disks, or optical disks. The electronic device 100 may also operate in relation to a web storage performing the storing function of the memory 160 on the Internet.

The interface 170 may serve as a path to all external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the electronic device 100. For example, the controller 180 may perform control and processing for voice communication. The controller 180 may also include an image processor 185 for processing images.

The power supply 190 receives external power and internal power and provides power required for each of the components of the electronic device 100 to operate under the control of the controller 180.

Various embodiments described in this document can be implemented in software, hardware or a computer readable recording medium. According to hardware embodiment, embodiments of this document may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and/or electrical units for executing functions. The embodiments may be implemented by the controller 180 in some cases.

According to software embodiment, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
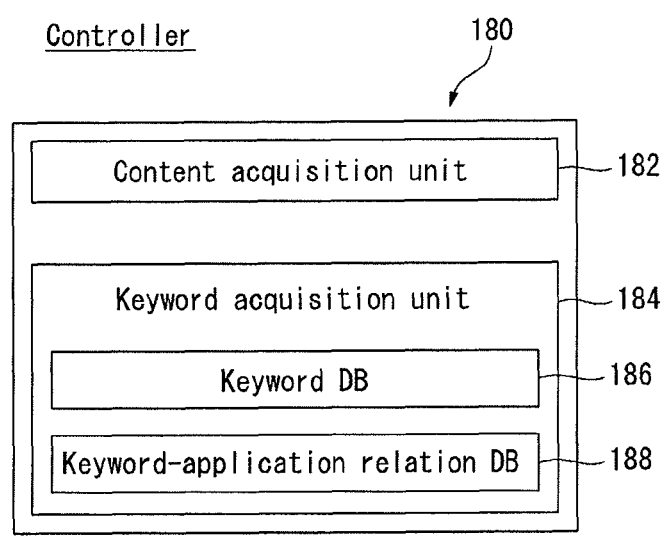
FIG. 2 is a block diagram illustrating a configuration of a controller according to an exemplary embodiment of the present invention.

FIG. 2 is a block diagram illustrating a configuration of a controller according to an exemplary embodiment of this document.

Referring to FIG. 2, the controller 180 according to an exemplary embodiment of this document includes at least one of a content acquisition unit 182 and a keyword acquisition unit 184.

The content acquisition unit 182 acquires contents. For example, the content acquisition unit 182 may acquire contents through the communication unit 110 or the memory 160.

Contents in this document may include at least one of web page, message, mail, e-book, audio, voice, image, and audio/video (A/V) contents. Further, the message may include at least one of a short message service (SMS), a multimedia messaging service (MMS), and an instant message (IM). Further, the contents may include other contents in addition to the above-described contents.

Contents acquired through the content acquisition unit 182 may be output through the output unit 150.

The keyword acquisition unit 184 may be a module for acquiring a keyword of the acquired contents. For this, the keyword acquisition unit 184 includes at least one of a keyword database (DB) 186 and a keyword application relation DB 188.

The keyword DB 186 may include at least one keyword that can be recognized by the keyword acquisition unit 184 in a DB. Hereinafter, a keyword DB will be described in detail with reference to FIG. 3.

FIG. 3 is a table illustrating a keyword DB according to an exemplary embodiment of this document.

Referring to FIG. 3, the keyword DB can classify and manage a keyword according to a predetermined reference. For example, the keyword DB may classify a keyword into a location, a time, a meeting, a feeling, an electronic device, a phone number, A/V contents, and other and manage a keyword of corresponding classification.

When a classification of the keyword corresponds to a location, the keyword may be Time Square, Namhyeon-dong, Gwanak-gu, Seoul, Korea, etc. Further, when a classification of the keyword is a time, 5:00 PM, afternoon, morning, etc., may be a keyword. Further, when a classification of the keyword is a meeting, 'meet', 'see', etc., may be a keyword. Further, a classification of the keyword is a feeling, gloom, happiness, etc., may be a keyword, when a classification of the keyword is an electronic device, an air conditioner, a refrigerator, etc., may be a keyword, when a classification of the keyword is a phone number, 051-254-8487, oh-five-one-four-three-five-two-four-seven-seven, etc., may be a keyword, and when a classification of the keyword is A/V contents, transformer 3 may be a keyword.

A user can adjust a classification of a keyword and a keyword belonging to a corresponding classification.

Because a classification of the keyword shown in FIG. 3 is an example, a keyword DB may include classifications more than or few than those of the keyword DB, and an example of a keyword of a corresponding classification may be more than the keyword.

That is, the keyword DB 186 manages a keyword, as described with reference to FIG. 3. Therefore, the keyword acquisition unit 184 acquires a keyword of random contents from the keyword DB 186.

In the foregoing description, the keyword DB 186 has been described. Hereinafter, the keyword-application relation DB 188 will be described.

The keyword-application relation DB 188 provides information for distinguishing an application related to a specific keyword. In other words, the keyword acquisition unit 184 can recognize an application corresponding to a recognized keyword through the keyword-application relation DB 188 and execute the application corresponding to the keyword.

Hereinafter, a relationship of a keyword and an application will be described in detail with reference to FIG. 4.

Figure 4:
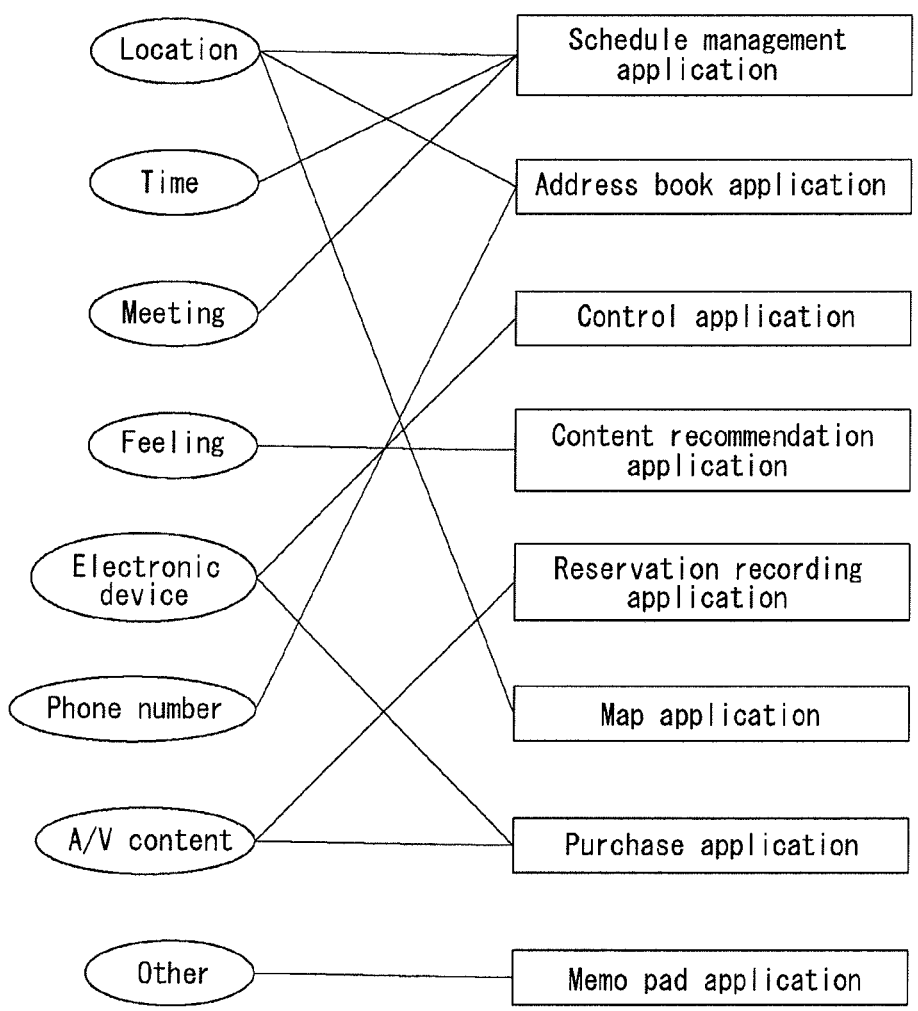
FIG. 4 is a diagram illustrating a keyword-application relation database according to an exemplary embodiment of the present invention.

FIG. 4 is a diagram illustrating a keyword-application relation DB according to an exemplary embodiment of this document.

A specific keyword corresponds to at least one application.

For example, when a keyword is related to a location, a corresponding keyword corresponds to one or more applications such as a schedule management application, an address book application, and a map application. Further, for example, when a keyword is related to an electronic device, a corresponding keyword corresponds to a control application and a purchase application. Further, for example, when a keyword corresponds to A/V contents, a corresponding keyword corresponds to a reservation recording application and a purchase application. Further, when a keyword is related to a time and a meeting, a corresponding keyword corresponds to a schedule management application, and when a keyword is related to a feeling, a corresponding keyword corresponds to a content recommendation application, and when a keyword is related to a phone number, a corresponding keyword corresponds to an address book application, and when a keyword is related to others, a corresponding keyword corresponds to an memo pad application.

The schedule management application may include any application for managing a schedule. For example, the schedule management application may include an outlook. Further, the address book application may include, for example, a phonebook. The control application may include any application for controlling another electronic device. For example, the control application may include an application for driving digital living network alliance (DLNA) for sharing contents and an application for driving Bonjour. Further, the control application may include any application for controlling a device to be controlled for home automation. Further, the purchase application may include an application for an electronic commercial transaction and an application for a social commerce. Further, the content recommendation application may indicate an application for recommending contents changing according to a feeling.

A keyword-application relationship shown in FIG. 4 is only an example for convenience of description. Therefore, a relationship of a keyword-application can be modified/changed by a user or a person of ordinary skill in the art.

As described with reference to FIG. 4, the keyword-application relation DB 188 manages a relationship between a keyword and an application, and the keyword acquisition unit 184 acquires information about an application related to the acquired keyword.

In the foregoing description, a configuration of an electronic device will be described with reference to FIGS. 1 to 4. Hereinafter, a method of operating an electronic device according to an exemplary embodiment of this document will be described based on a configuration of the above-described electronic device with reference to FIG. 5.

Figure 5:
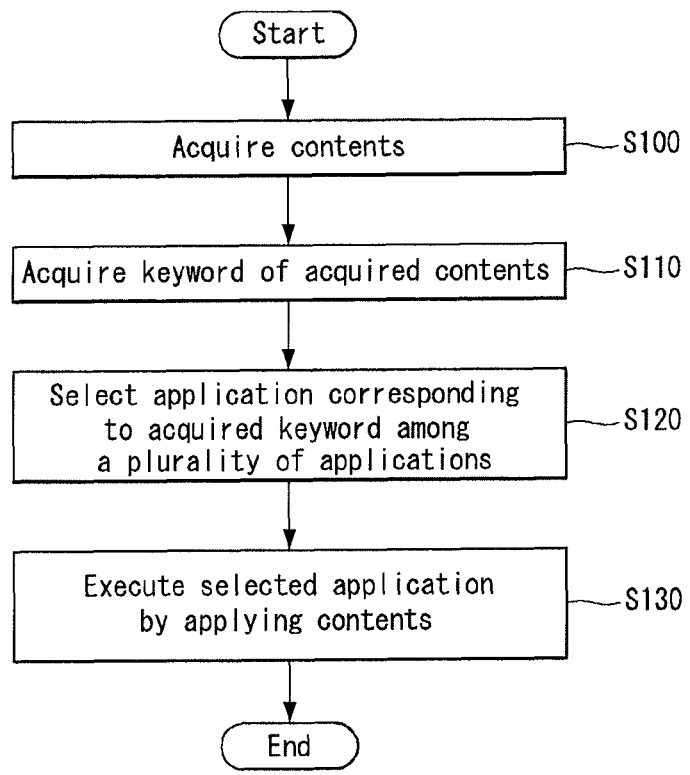
FIG. 5 is a flowchart illustrating a method of operating an electronic device according to an exemplary embodiment of the present invention.

FIG. 5 is a flowchart illustrating a method of operating an electronic device according to an exemplary embodiment of this document. This method and other methods of the present invention can be implemented using the device(s) of FIGS. 1-4 or other suitable device(s).

In a method of operating an electronic device according to an exemplary embodiment of this document, when recognizing a keyword of random contents and executing an application corresponding to the recognized keyword, the contents can be applied to the application corresponding to the keyword. Therefore, because the electronic device provides an application execution environment corresponding to a user intention according to contents, the user can conveniently use the application.

For this, a method of operating an electronic device according to an exemplary embodiment of this document includes at least one of step of acquiring contents (S100), step of acquiring a keyword of the acquired contents (S110), step of selecting an application corresponding to the acquired keyword among a plurality of applications (S120), and step of executing the selected application by applying the contents (S130).

Hereinafter, each step will be described in detail.

The electronic device 100 acquires contents (S100). For example, the electronic device 100 may acquire specific contents according to a control signal in which a user generates through the user input unit 120.

As described above, various kinds of contents may exist. For example, various contents such as web page, message, mail, e-book, attached file, audio, image, voice, and A/V contents may exist.

The electronic device 100 outputs the acquired contents through the output unit 150.

The electronic device 100 acquires a keyword of the acquired contents (S110).

When a user request exists, the electronic device 100 may acquire a keyword of contents, and for another example, when a specific application is executed, the electronic device 100 may acquire a keyword of contents.

The keyword acquisition unit 184 of the electronic device 100 acquires a keyword related to acquired contents through the keyword DB 186.

Figures 6, 7:
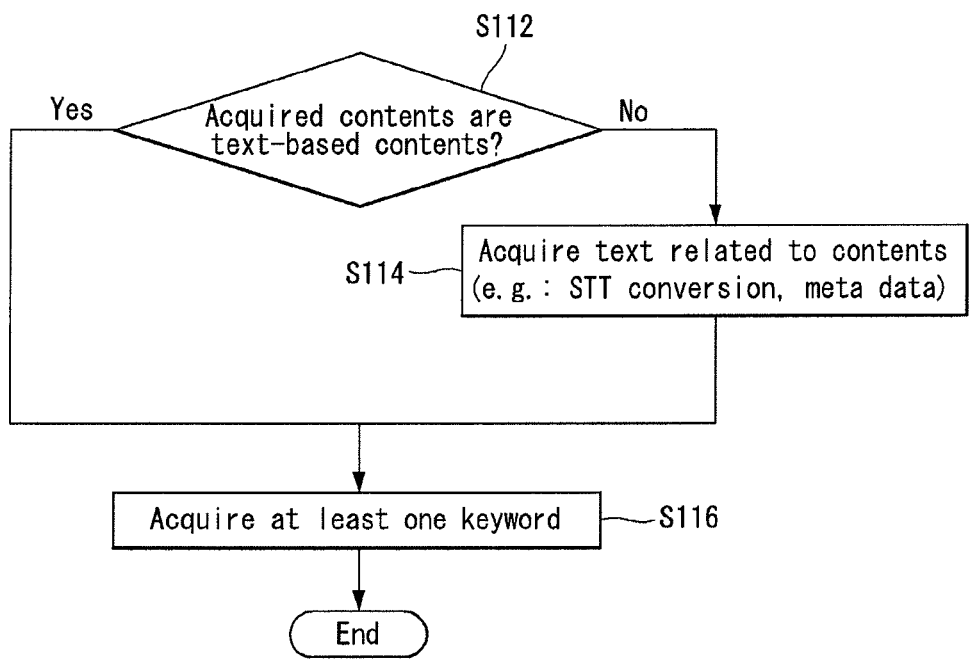
FIG. 6 is a flowchart illustrating step S110 of FIG. 5.
FIG. 7 is a table illustrating a kind of contents according to an exemplary embodiment of the present invention.

Step S110 will be described in detail with reference to FIG. 6. FIG. 6 is a flowchart illustrating step S110 of FIG. 5.

Referring to FIG. 6, step S110 includes at least one of step of recognizing whether the acquired contents are text-based contents (S112), step of acquiring a text related to contents when the acquired contents are non-text based contents (S114), and step of acquiring at least one keyword (S116).

The controller 180 determines whether the acquired contents at step S100 are text-based contents (S112).

FIG. 7 is a table illustrating a kind of contents according to an exemplary embodiment of this document.

As shown in FIG. 7, when the acquired contents are a web page, a message, a mail, and an e-book, the controller 180 determines that text-based contents are acquired, and when the acquired contents are audio (including communication), image, and A/V contents, the controller 180 determines that non-text based contents are acquired.

If the acquired contents are non-text based contents, the controller 180 acquires a text related to non-text based contents (S114).

This corresponds to a pre-processing process in which the controller 180 acquires a keyword of non-text based contents.

The controller 180 acquires text-based contents related to non-text based contents with different methods according to a kind of non-text based contents.

For example, when the acquired contents are audio contents such as communication, the controller 180 acquires text-based contents by performing a speech to text (STT) function.

For example, the controller 180 may acquire a voice waveform in order to perform the STT. When a voice waveform is acquired, the controller 180 acquires a sound piece in a predetermined cycle, for example a unit of ¹⁄₁₀₀ second. The controller 180 recognizes voice by digitalizing a sound piece.

In this case, the controller 180 uses various modeling techniques. For example, the controller 180 may use a modeling technique such as an acoustic model, a lex model, and a language model. In this case, the acoustic model accurately receives all sounds including meaningless sound such as "um . . . " and "eo . . . " and recognizes voice by distinguishing a meaning syllable. The lex model understands, for example, a pronunciation of 'economic' and 'iconomic' as 'economic' using a dictionary method. That is, the lex model represents that which acoustic model is related to which text. Further, the language model is a method of searching for a language that can understand. For example, statistically, a possibility that a word next to "the dog" will be 'ran' among words 'ran', 'pan', and 'can' is high. That is, the language model is a method of recognizing voice using a semantic method.

The controller 180 performs an STT by outputting the recognized voice to a text through the modeling technique.

Figure 8:
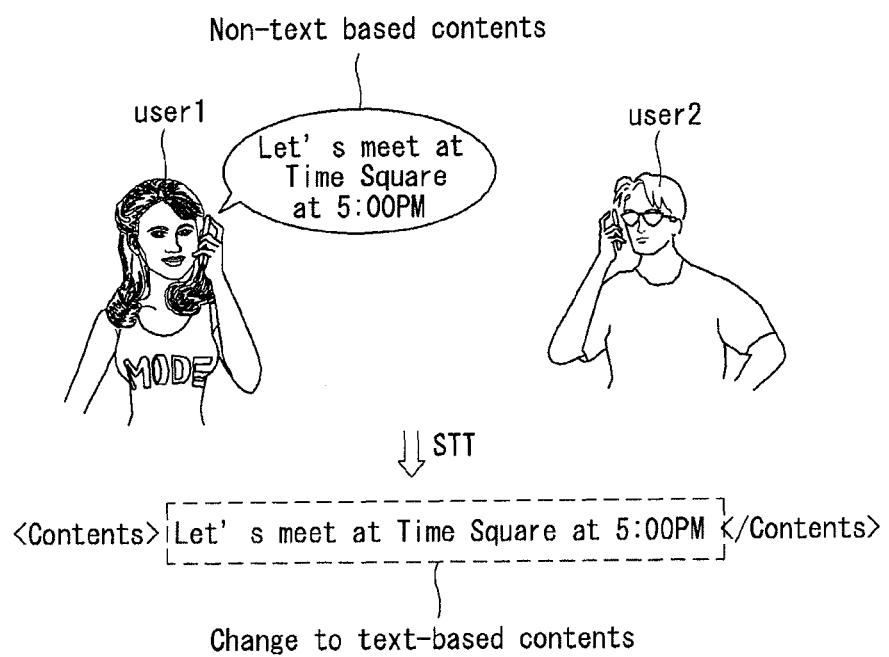
FIG. 8 is a diagram illustrating an STT according to an exemplary embodiment of the present invention.

FIG. 8 is a diagram illustrating an STT according to an exemplary embodiment of this document.

Referring to FIG. 8, a user 1 can transmit to a user 2 a voice message "Let's meet at Time Square at 5:00 PM". That is, when a voice message "Let's meet at Time Square at 5:00 PM" is generated, the electronic device 100 converts voice contents to text-based contents by performing an STT.

For example, when the acquired contents are A/V contents, the controller 180 may acquire text-based contents through meta data.

Figure 9:
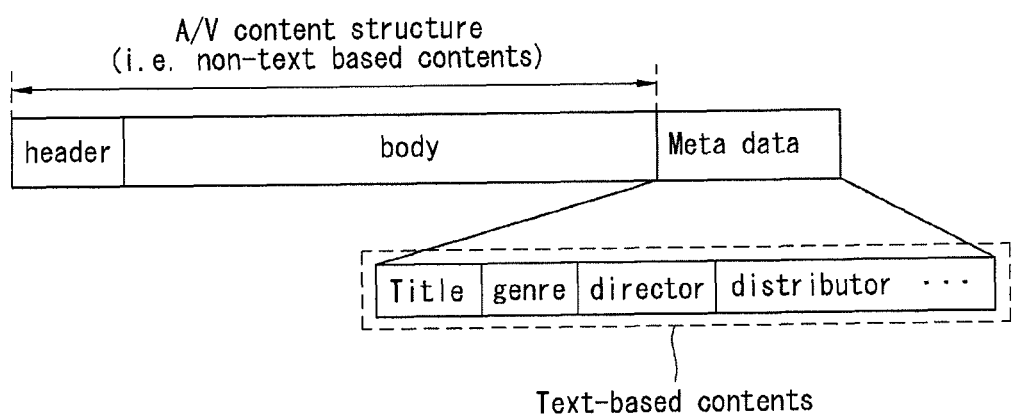
FIG. 9 is a diagram illustrating meta data acquisition according to an exemplary embodiment of the present invention.

FIG. 9 is a diagram illustrating meta data acquisition according to an exemplary embodiment of this document.

Referring to FIG. 9, the A/V contents include at least one of a header, a body, and meta data. The controller 180 acquires meta data of A/V contents, thereby acquiring information included in the meta data as text-based contents.

Accordingly, the controller 180 acquires information such as a title, a genre, a director, and a distributor included in meta data as text contents.

Further, even when contents are A/V contents, the STT can be applied for keyword recognition. For example, when the acquired contents are image contents, the controller 180 may acquire text-based contents through an image processing.

Figure 10:
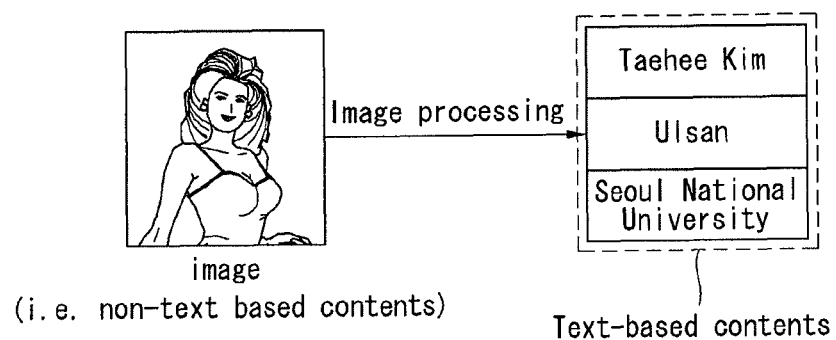
FIG. 10 is a diagram illustrating an image processing according to an exemplary embodiment of the present invention.

FIG. 10 is a diagram illustrating an image processing according to an exemplary embodiment of this document.

Referring to FIG. 10, when the acquired contents are image contents, the controller 180 can acquire information related to an image by analyzing the image. For example, referring to FIG. 10, the controller 180 may acquire information such as a name, a native place, and schools attended of an image person through an image processing.

At step S114 described with reference to FIGS. 7 to 9, even when non-text based contents are acquired, the controller 180 can acquire text-based contents.

Referring again to FIG. 6, the controller 180 can acquire at least one keyword from or associated with the content (S116).

For example, when acquiring text-based contents at step S100 and when acquiring text-based contents at step S114, the controller 180 may acquire at least one keyword related to corresponding contents.

For this, the controller 180 uses the keyword DB 186. That is, the controller 180 acquires a keyword related to the acquired contents from the keyword DB 186.

The controller 180 acquires a keyword related to the acquired contents according to an exemplary embodiment described with reference to FIG. 6. Particularly, even when non-text based contents are acquired, the controller 180 can easily acquire contents by acquiring text-based contents related thereto.

Referring again to FIG. 5, the controller 180 selects an application corresponding to the acquired keyword among a plurality of applications (S120).

More specifically, the controller 180 acquires one or more applications related to the acquired keyword through the keyword-application relation DB 188. For example, when a keyword A is acquired, the controller 180 may acquire an application related to the keyword A from the keyword-application relation DB 188.

In this case, a keyword acquired at step S110 may be at least one. That is, the controller 180 may acquire a plurality of keywords or one keyword according to contents.

Further, an application corresponding to each of at least one acquired keyword may be at least one. That is, the controller 180 may select a single application or a plurality of applications corresponding to a keyword.

Step S120 will be described in detail with reference to FIG. 11.

Figures 11, 12:
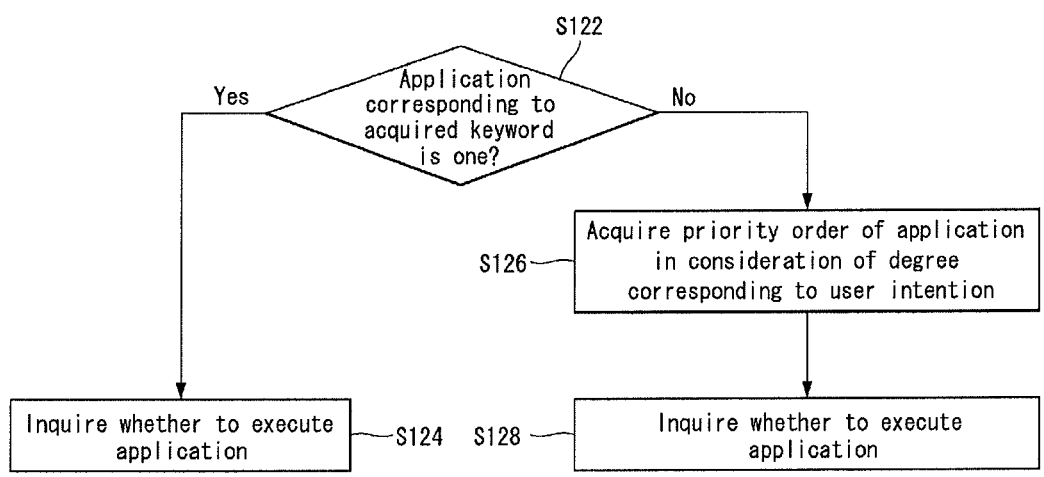
FIG. 11 is a flowchart illustrating step S120 of FIG. 5.
FIGS. 12 and 13 are diagrams illustrating step S124 of FIG. 11.

FIG. 11 is a flowchart illustrating step S120 of FIG. 5.

Referring to FIG. 11, the controller 180 determines whether an application corresponding to the acquired keyword is one (S122).

If an application corresponding to the acquired keyword is one, the controller 180 controls to output a user interface for inquiring whether to execute an application (S124). A more detailed description will be described with reference to FIGS. 12 and 13.

If an application corresponding to the acquired keyword is plural, the controller 180 acquires a priority order of an application in consideration of certain information such as a degree corresponding to a user intention (S126). This is to provide an application corresponding to a user intention/preference when an application corresponding to the acquired keyword is plural.

Further, the controller 180 controls to output a user interface for inquiring whether to execute a selected application in consideration of a user intention (S128). A more detailed description will be described with reference to FIGS. 14 and 15.

Figure 13:
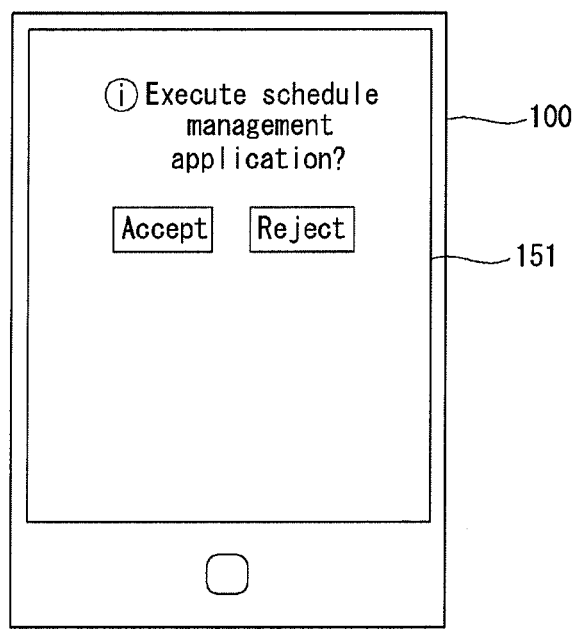

Step S124 will be described in detail with reference to FIGS. 12 and 13. FIGS. 12 and 13 are diagrams illustrating step S124 of FIG. 11.

Referring to FIG. 12, the acquired keyword is 17:00 PM, and an application corresponding to 17:00 PM is a schedule management application. More specifically, when 17:00 PM is acquired as a keyword of contents, the controller 180 recognizes that an application corresponding to 17:00 PM is a schedule management application in the keyword-application DB 188.

In this case, the controller 180 determines that an application corresponding to the acquired keyword is one. Accordingly, the controller 180 controls to output a user interface for inquiring whether to execute a schedule management application, which is an application corresponding to a keyword, as shown in FIG. 13.

Figures 14, 15:
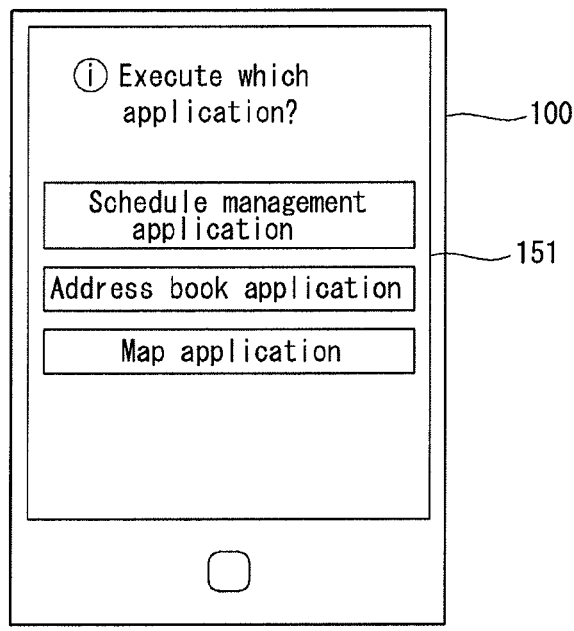
FIGS. 14 and 15 are diagrams illustrating steps S126 and S128 of FIG. 11.

Steps S126 and S128 will be described in detail with reference to FIGS. 14 and 15. FIGS. 14 and 15 are diagrams illustrating steps S126 and S128 of FIG. 11.

Referring to FIG. 14, the acquired keyword is two of Time Square and 17:00 PM. In this case, the controller 180 recognizes that an application corresponding to the Time Square is a schedule management application, an address book application, and a map application and that an application corresponding to 17:00 PM is a schedule management application through the keyword-application relation DB 188.

In this case, the controller 180 recognizes that an application corresponding to the acquired keyword is plural.

When an application corresponding to the acquired keyword is plural, the controller 180 provides a higher priority order to an application corresponding to a user intention among a plurality of applications.

The controller 180 searches for an application corresponding to a user intention with various methods.

For example, when a plurality of keywords are acquired, the controller 180 provides a priority order to a strongly corresponding application by each of the plurality of keywords. Referring to FIG. 14, it can be seen that a schedule management application strongly corresponds by each of Time Square and 17:00 PM, which are a plurality of keywords. However, it can be seen that an address book application and a map application correspond only to Time Square, which is a keyword and do not correspond to 17:00 PM, which is a keyword. Accordingly, the controller 180 gives 2 points to the schedule management application and gives 1 point to each of the address book application and the map application. Thereby, the controller 180 determines that a priority order of a schedule management application having the highest given point is higher that of the address book application and the map application.

For example, the controller 180 may give a priority order to an application in which a user's use frequency is highest, e.g., based on the frequency of using the application. For example, when an application having a highest user's use frequency is a map application among a schedule management application, an address book application, and a map application shown in FIG. 14, the controller 180 determines that a priority order of the map application is higher than that of the schedule management application and the address book application.

Hereinafter, for convenience of description, it is assumed that a schedule management application has a priority order higher than that of an address book application and a map application.

The controller 180 controls to output a user interface for inquiring whether to execute a plurality of applications in consideration of a priority order.

That is, as shown in FIG. 15, the controller 180 forms and displays, on the screen of the electronic device, a user interface to position a schedule management application having a high priority order at a position higher than that of other applications. As a variation, information on the priority order may also be displayed with the corresponding applications on the screen of the electronic device.

Accordingly, the user can more simply select an application corresponding to a user intention.

The controller 180 receives a request for execution of a specific application through a user interface for inquiring whether to execute an application. Hereinafter, a case where the controller 180 receives a request for execution of a specific application will be described with reference to FIG. 16.

Figure 16:
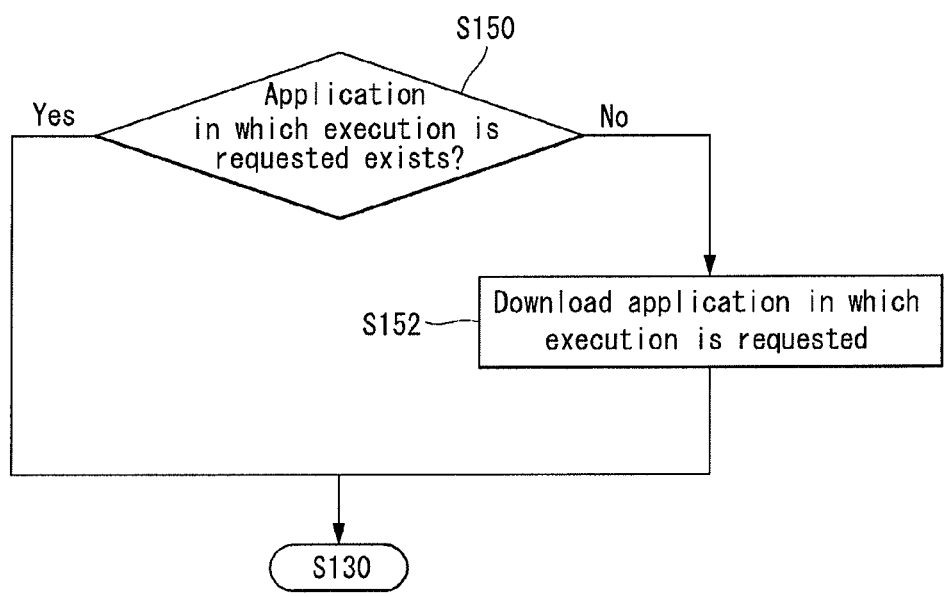
FIG. 16 is a flowchart illustrating a case of receiving a request for execution of a specific application according to an exemplary embodiment of the present invention.

FIG. 16 is a flowchart illustrating a case of receiving a request for execution of a specific application according to an exemplary embodiment of this document. Here the specific application may be an application selected/approved by the user for execution among the multiple corresponding applications, or a single corresponding application selected/approved by the user for execution.

Referring to FIG. 16, the controller 180 determines whether an application in which execution is requested exists (S150).

More specifically, when a request for execution of an application corresponding to a keyword receives from a user, the controller 180 determines whether an application in which execution is requested is stored in the memory 160.

If an application in which execution is requested is stored in the memory 160, the process continues step S130.

If an application in which execution is requested is not stored in the memory 160, the controller 180 downloads the application in which execution is requested (S152). For example, the controller 180 may download the application in which execution is requested by connecting to a predetermined server through the communication unit 110. When the controller 180 downloads the application in which execution is requested, the process continues at step S130.

In the foregoing description, a method of preparing execution of the application in which execution is requested will be described with reference to FIG. 16.

Referring again to FIG. 5, the controller 180 executes the selected application by applying the contents (S130).

Execution of a selected application by applying the contents can preferably mean execution of an application based on contents. For example, when an executed application is a schedule management application, the controller 180 may automatically generate an appointment time and an appointment location, etc., in consideration of or using the contents. Thereby, the controller 180 provides more convenient application execution environment.

Particularly, the controller 180 may apply a portion recognized as a keyword in the contents to an application to execute. This is because a keyword related to an application can be recognized as user interest contents.

Further, the controller 180 controls to output a user interface for verifying whether the contents/keyword(s) initially applied to the application are accurately reflected. For example, when the contents are communication contents, the controller 180 may not accurately recognize communication contents according to voice recognition accuracy. In this case, the controller 180 provides one or more candidate contents for a user to select the contents from the candidate contents. Thereby, the controller 180 accurately reflects contents corresponding to a user intention to the application.

Further, the controller 180 determines whether a control signal generated through an application overlaps with another control signal. For example, when an executed application is a control application, the controller 180 may determine whether a control signal generated by the control application overlaps with another control signal. If the control signal generated through the control application overlaps with another control signal, the controller 180 controls to output an overlapping notification message through the output unit 150. Further, for example, when an executed application is an address book application, the controller 180 determines whether an address book generated by the address book application overlaps with existing other address books, and if the address book generated by the address book application overlaps with the existing other address books, the controller 180 controls to output an overlapping notification message through the output unit 150. Thereby, when the control signal generated through the application overlaps with an existing control signal, the controller 180 guides the user to recognize this. The overlapping notification message preferably may notify to the user that some items may be overlapped, e.g., there may already exist an address book having the same address or contact information, etc.

Further, the controller 180 determines whether a schedule generated through an application overlaps with another schedule already stored in the electronic device. For example, when an executed application is a schedule management application, the controller 180 determines whether a schedule generated through the schedule management application overlaps with any existing other schedules. If the schedule generated through the schedule management application overlaps with the existing other schedules, the controller 180 controls to output an overlapping notification message through the output unit 150 and thereby notifies the user that the same or similar schedule already exists.

Further, when a control signal for controlling another/external electronic device is generated by an application of the electronic device 100, the controller 180 controls to output a notification message representing whether the control signal for controlling the another/external electronic device has been successfully performed through the output unit 150. For example, when a control signal generated in the controller 180 is a control signal for controlling an air conditioner (e.g., use the electronic device 100 to control the air conditioner remotely), the controller 180 can receive a signal from the air conditioner indicating whether or not the air conditioner has successfully processed the control signal from the electronic device 100, and then controls to output a notification message representing whether or not the air conditioner has successfully processed the control signal. Thereby, the controller 180 provides convenience for the user to determine whether the control signal is successfully processed.

Further, when a schedule is generated by a schedule management application, the controller 180 provides information related to a schedule using a notification message to the user. The notification message can be at least one of a visual notification (e.g., on the screen of the electronic device 100), an audio notification (e.g., via the audio output unit of the electronic device 100), a vibration notification, etc.

Step S130 will be described in detail with reference to FIGS. 17 and 18.

Figure 17:
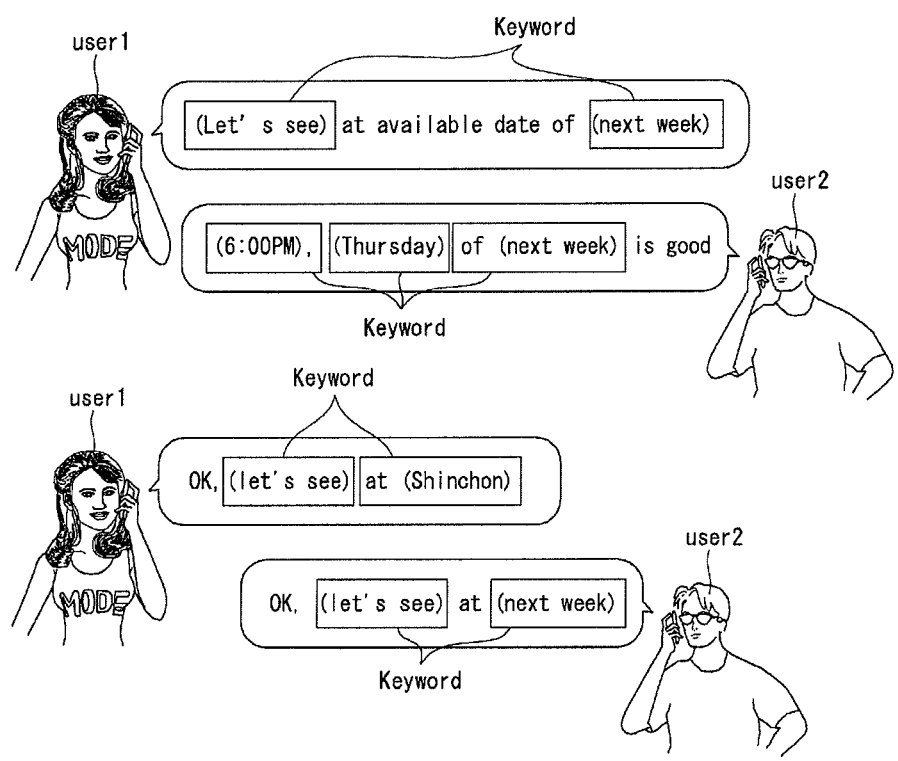
FIGS. 17 and 18 are diagrams illustrating step S130 of FIG. 5.
Figure 18:
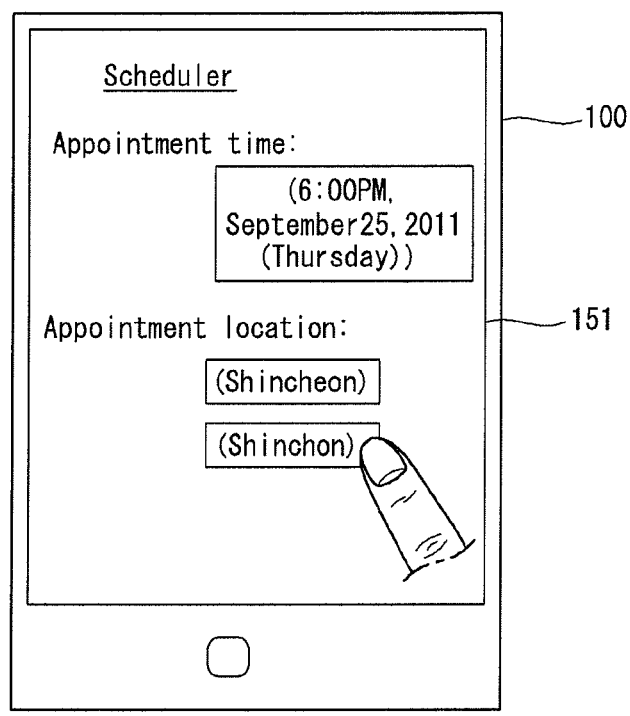

FIGS. 17 and 18 are diagrams illustrating step S130 of FIG. 5. Further, FIGS. 17 and 18 illustrate step S130 when an executed application is a schedule management application.

Referring to FIG. 17, it can be seen that communication contents are generated between a user 1 and a user 2. In communication contents, "next week, let's see at Thursday, 6:00 PM, Shinchon", etc. are recognized as a keyword. Accordingly, it is assumed that a schedule management application is executed.

Referring to FIG. 18, when executing a schedule management application, the controller 180 automatically generates a schedule by reflecting communication contents. That is, the controller 180 recognizes the communication contents and generates a schedule based on information in which an appointment time is "6:00 PM, Thursday of a next week". Such information that is automatically selected and inserted into a schedule that is displayed to the user, is obtained automatically by the controller 180 from the communicated contents. Thereby, the controller 180 reflects contents to an application together with an application execution, thereby providing user convenience. Therefore, the user can reduce an input time and inconvenience.

Further, when executing an application by reflecting contents, the controller 180 provides a user interface for the user to verify accuracy of the scheduler having the automatically-inserted contents with possible candidate contents. For instance, referring to FIG. 18, the controller 180 automatically generates the scheduler of FIG. 18 using the words from the communicated contents. If the accuracy of certain contents in the scheduler is questionable, the controller 180 controls to output one or more possible candidate contents. For example, as shown in FIG. 18, when recognizing the communication contents, if it is unclear that an appointment location should be one of "Sincheon" and "Shinchon", the controller 180 suggests each of "Sincheon" and "Shinchon" as candidate contents for the appointment location in order to guide a selection of the user. Then the user can select the desired content for the appointment location among the candidate contents. Further, the user can select an appointment time portion and adjust or additionally write an appointment time. Thereby, the user can verify whether all the contents for the scheduler are appropriately reflected.

Figure 19:
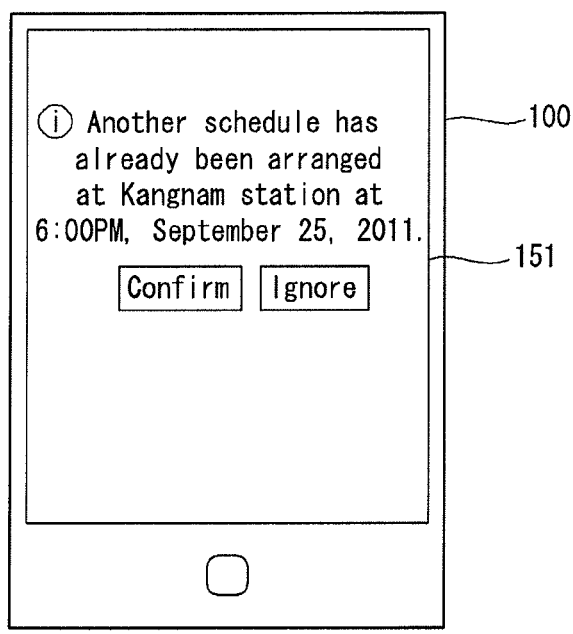
FIG. 19 is a diagram illustrating an overlapping notification message according to an exemplary embodiment of the present invention.

Further, the controller 180 determines whether a schedule generated by the executed application overlaps with another schedule. For example, as shown in FIG. 18, when a schedule of "Shinchon, 6:00 PM, Sep. 25, 2011" is arranged, the controller 180 determines whether the corresponding schedule overlaps with a previously generated schedule. More specifically, when a schedule of Kangnam station, 6:00 PM, Sep. 25, 2011 is previously arranged, the controller 180 determines that this previously arranged schedule overlaps with the schedule of "Shinchon, 6:00 PM, Sep. 25, 2011" shown in FIG. 18. In this case, as shown in FIG. 19, the controller 180 controls to output an overlapping notification message that the corresponding schedule overlaps with the previously arranged schedule. The user then decide whether to accept the corresponding schedule of FIG. 18 and can also modify the schedule of FIG. 18 in view of the existing schedule.

Figure 20:
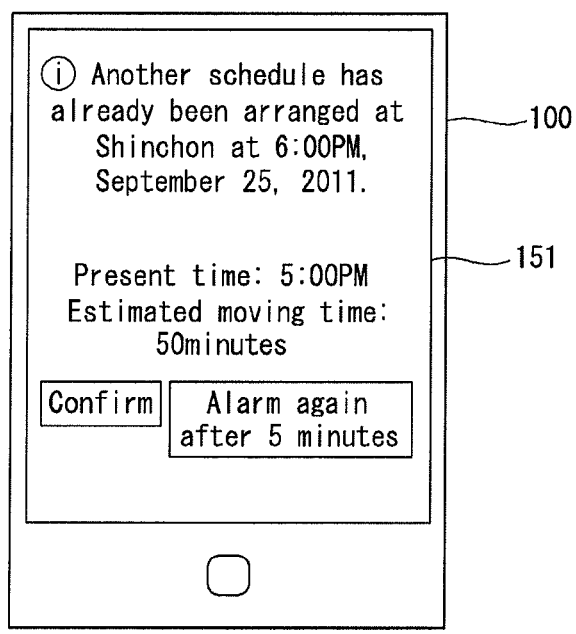
FIG. 20 is a diagram illustrating a schedule notification message according to an exemplary embodiment of the present invention.

Further, as shown in FIG. 18, when the schedule of "Shinchon, 6:00 PM, Sep. 25, 2011" is being arranged, the controller 180 controls to previously output a notification message before an appointment time. That is, as shown in FIG. 20, the controller 180 controls to output an appointment notification message through the output unit 150. In this case, the appointment notification message may include present time information, estimated moving time information, etc. Thereby, the user can effectively manage the schedule.

In the foregoing description, a method of operating an electronic device according to an exemplary embodiment of this document has been described with reference to FIG. 5.

According to an exemplary embodiment of this document, when recognizing keyword(s) of contents and executing an application of the recognized keyword, by applying the contents, user convenience can be maximized.

Hereinafter, an example of applying a method of operating an electronic device according to an exemplary embodiment of this document will be described. The above-described method of operating an electronic device can be applied to an application example described hereinafter.

Figure 21:
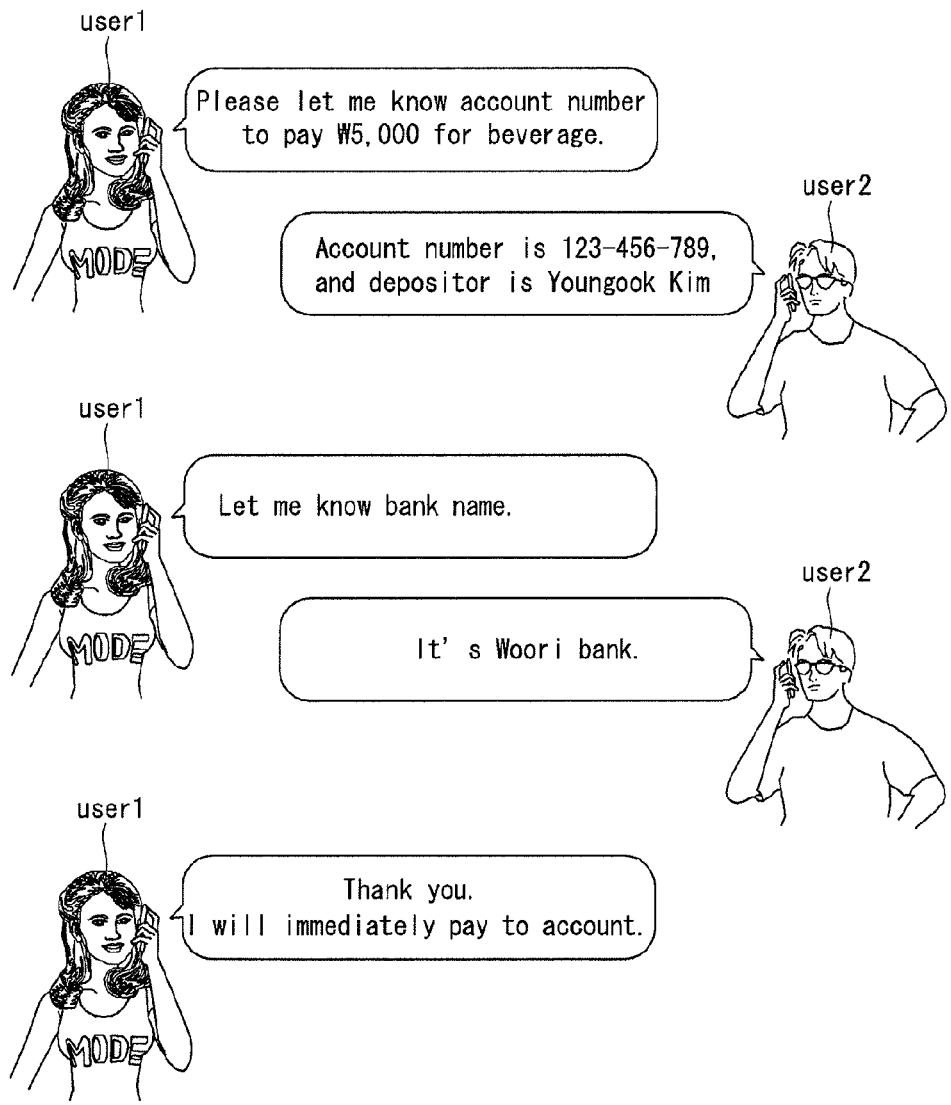
FIGS. 21 and 22 are diagrams illustrating a first application example of a method of operating an electronic device according to an exemplary embodiment of the present invention.
Figure 22:
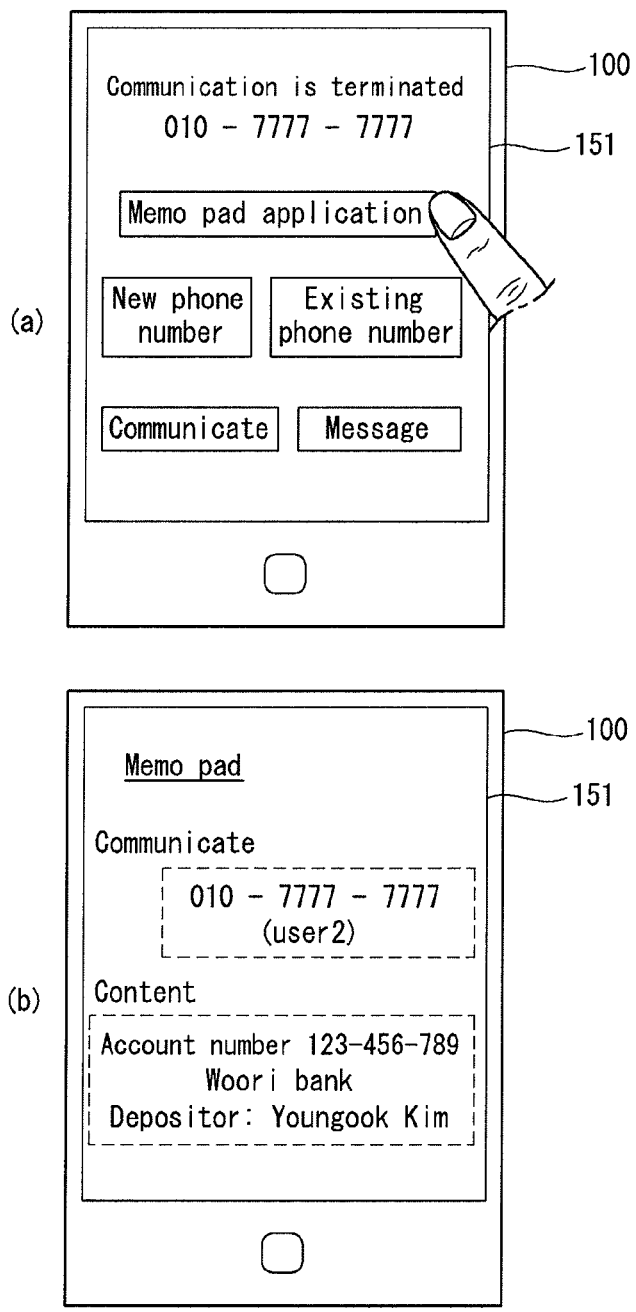

FIGS. 21 and 22 are diagrams illustrating a first application example of a method of operating an electronic device according to an exemplary embodiment of this document.

FIG. 21 illustrates content acquisition according to step S100. That is, contents shown in FIG. 21 correspond to communication contents, which is an example of voice contents.

The controller 180 recognizes a keyword through the communication contents. In this case, the controller 180 performs an STT in order to convert the communication contents to text-based contents for keyword recognition.

The controller 180 recognizes that a corresponding application is a memo pad application through keyword(s) of the communication contents. That is, the controller 180 recognizes that a memo pad application should be executed through the keyword-application relation DB 188.

As shown in FIG. 22(*a*), the controller 180 provides a user interface for inquiring whether to execute the recognized application, in this example, the memo pad application. Accordingly, when the user requests execution of the memo pad application, the controller 180 performs an automatic generation function based on the communication contents when executing the memo pad application. Further, FIG. 22(*b*) illustrates a user interface for verifying contents generated according to the automatic generation function. For instance, the controller 180 automatically obtains certain contents from the communication contents and then automatically generates a memo pad as shown in FIG. 22(*b*) on the screen with such contents for the user's verification/modification. The user can edit the contents automatically generated in the memo pad through the user interface shown in FIG. 22(*b*).

Figure 23:
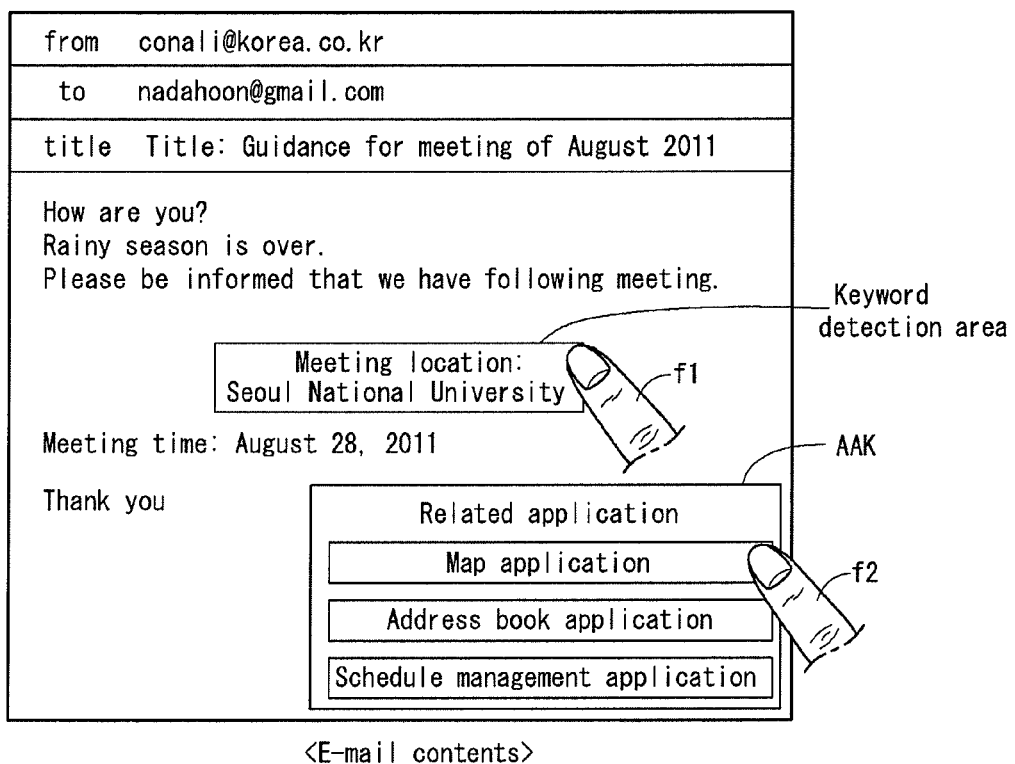
FIGS. 23 and 24 are diagrams illustrating a second application example of a method of operating an electronic device according to an exemplary embodiment of the present invention.
Figure 24:
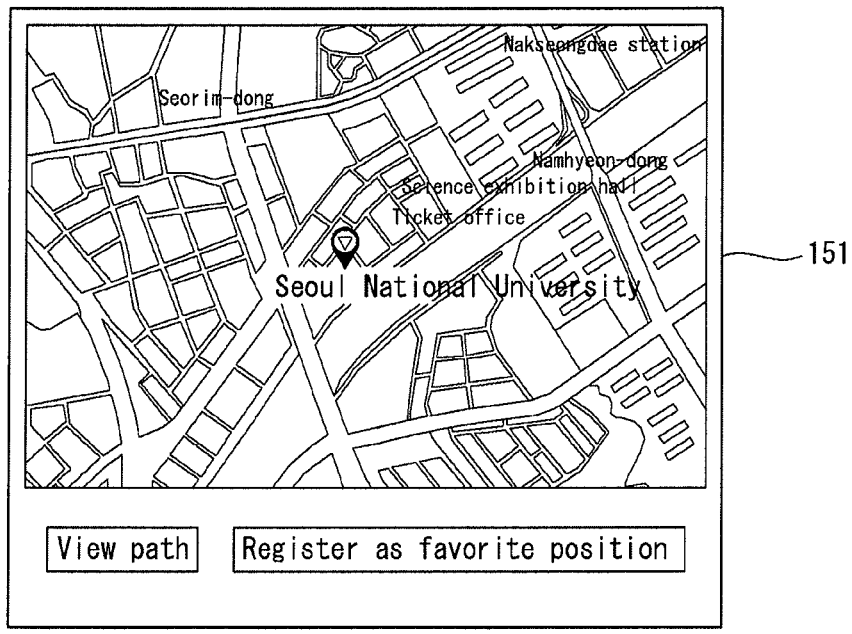

FIGS. 23 and 24 are diagrams illustrating a second application example of a method of operating an electronic device according to an exemplary embodiment of this document.

FIG. 23 illustrates contents acquired according to step S100. Contents shown in FIG. 23 correspond to e-mail contents.

The controller 180 recognizes keyword(s) of the e-mail contents. In other words, the controller 180 recognizes keyword(S) existing in the e-mail contents through the keyword DB 186 or from an external electronic device such as a server or other mobile terminal. In this case, the user can designate a keyword detection area. For example, as shown in FIG. 23, the user can designate "meeting location: Seoul National University, Gwanak-gu, Seoul" provided in the displayed e-mail contents as a keyword detection area through a touch & drag input (f1). Then the controller 180 detects the keyword(s) from the area(s) designated as the keyword detection area(s). As shown in FIG. 23, a location "Seoul National University, Gwanak-gu, Seoul" can be recognized as a keyword. That is, the user can pre-designate certain areas as the keyword detection areas or can designate certain areas in real time as the keyword detection areas. For instance, in the case of pre-designating the keyword detection areas, the user can pre-designate the title or subject area of all emails as one keyword detection area. In the case of designating the keyword detection area in real time, when a certain email is displayed on the screen of the electronic device 100, then the user can review the displayed contents of the email and select a certain area within the displayed content as the keyword detection area. Accordingly, because the controller 180 detects a keyword from the designated detection area instead of searching for a keyword from the entire e-mail contents, the controller 180 detects the keyword in which the user wants with a simple process.

When a keyword of "Seoul National University, Gwanak-gu, and Seoul" is recognized as the keyword, the controller 180 determines an application corresponding to the keyword in the keyword-application relation DB 188 or from via another source. As shown in FIG. 4, an application related to a location may be a map application, an address book application, and a schedule management application. The controller 180 then controls to output a related application window AAK in which an application corresponding to the keyword "Seoul National University, Gwanak-gu, and Seoul" is determined to be a map application, an address book application, and a schedule management application. The AAK displays all the related applications for the user's selection. Further, when multiple related application are identified, then the AAK may display such related application according to the priority order discussed hereinabove previously. In this case, the user can select a specific application from the identified related applications. Hereinafter, for convenience of description, a case f2 where the user selects a map application is considered referring to FIG. 24.

When the map application is selected from the list of related applications displayed in FIG. 23, the controller 180 executes the map application and applies the e-mail contents to the map application. In this case, the controller 180 applies contents of the keyword detection area among the email contents to the map application. Accordingly, the controller 180 searches for the keyword ("Seoul National University, Gwanak-gu, Seoul") through the map application and outputs a result value thereof, as shown in FIG. 24. Here, the map application displays a map showing the location of the keyword content ("Seoul National University, Gwanak-gu, Seoul").

After the map application has been executed in FIG. 24, the user may return to the screen of FIG. 23 and then can select any other application among the displayed applications in the AAK. In that case, the next selected application is executed and the controller 180 may automatically apply relevant contents from the email content to the next selected application (e.g., auto-fill data from the e-mail content to the pages of the next selected application) to assist the user with the data management, storage, execution and application. As a variation, the user may be able to select all listed applications at one time. In that case, the controller 180 may automatically generate appropriate pages for each of the applications by applying the relevant contents to the application pages. Such pages may be displayed sequentially in order or may be simultaneously displayed (if the display is of a sufficient size) for the user's confirmation.

As a variation, in the example of FIG. 23, using the contents from the e-mail, the controller 180 can automatically execute a schedule application to automatically generate a schedule/appointment that shows the time, meeting place, etc. The user can then verify this schedule/appointment for storage. Still another variation, if the user selects the schedule management application from the AAK, then this application can generate such a schedule/appointment using all the contents from the email for the user's verification and storage.

Thus, according to the above various examples, the electronic device 100 may open a specific application (e.g., phone application) among a plurality of different applications provided by the electronic device 100, based on a user's input. Then during the phone conversation using the electronic device 100 (while the phone application is running), the controller 180 then may obtain one or more keywords from the actual phone conversations (communication contents) and identify one or more applications corresponding to the keyword(s). The controller 180 may select one of these corresponding applications (if multiple corresponding applications are identified), and then may execute the selected corresponding application by applying the keywords or other contents from the communication contents. Pop-ups, windows, or pages may be generated by the executed corresponding application with the keywords/contents applied for the user's verification, confirmation, modification, etc. For instance, if a memo pad application is selected as the corresponding application and executed during the phone conversation by the controller 180 (while the phone application is running), a page such as one shown in FIG. 22(*b*) may be displayed. Here, the controller 180 may identify, select and execute the corresponding application (e.g., memo pad application) based on the keyword(s), while the phone application (main application) is running or after the opened phone application is closed. In addition, if the selected corresponding application is not stored in the electronic device 100, then it can be downloaded to the electronic device 100 from a server for execution.

Further, as a variation, the keyword acquisition unit may obtain the keyword(s) from the keyword DB or from an external electronic device. The keyword-application related DB is updated to provide updated relatedness between the keywords and multiple applications. If In the foregoing description, an application example of a method of operating an electronic device according to an exemplary embodiment of this document has been described. Because the application example is an example, a range of this document is not limited to the above-described application example.

Various exemplary embodiments disclosed in this document can be executed individually or in combination. Further, steps constituting each exemplary embodiment can be executed in combination of steps constituting other exemplary embodiments.

In this document, when describing the keyword acquisition unit 184, it is described that the keyword acquisition unit 184 can acquire a keyword of contents. Alternatively, the keyword acquisition unit 184 can acquire a keyword generated in another electronic device through a communication unit.

Various exemplary embodiments of this document can be embodied by computer readable media. The media may include a single or a combination of, for example, a program code, a data file, and a data structure for embodying an exemplary embodiment of this document. An example of such media may include media structured to store and execute a program, such as magnetic media, optical recording media such as a CD and a DVD, a ROM, a RAM, and a flash memory. An example of a program code may include a high-level language code that can be executed by a computer using an interpreter as well as a machine language code manufactured by a compiler.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a keyword acquisition unit configured to obtain at least one keyword from a communication content, wherein the communication content has been converted into a text-based content including at least one text segment;
a controller configured:
to identify at least one available application corresponding to the at least one keyword obtained by the keyword acquisition unit;
to provide a first user interface for selecting a specific application among the at least one available application; and
to provide a second user interface for verifying or editing a keyword content when the specific application is selected,
wherein the keyword content is automatically generated according to an execution of the specific application,
wherein before the keyword acquisition unit obtains the at least one keyword from the communication content, the controller opens one of a plurality of different applications provided in the electronic device based on a user's input and receives the communication content from which the at least one keyword is obtained, and
wherein while the one of the plurality of different applications is running, the controller provides the first user interface for selecting the specific application and provides the second user interface for verifying or editing the keyword content when the specific application is selected; and
a display unit configured to display the verified or edited keyword content.

2. The electronic device of claim 1, wherein the controller is further configured to provide plural candidate keywords when a recognition rate of the communication content is lower than a predetermined reference, and the keyword acquisition unit is further configured to obtain the at least one keyword from the plural candidate keywords.

3. The electronic device of claim 1, wherein the communication content includes at least one of a video content and an audio content.

4. The electronic device of claim 1, wherein the controller is further configured to receive a user's response to the verified or edited keyword content.

5. The electronic device of claim 4, wherein the controller is configured to fully perform the started application on the communication content upon receipt of the user's confirmation of the verified or edited keyword content.

6. The electronic device of claim 1, wherein the keyword acquisition unit is configured to obtain the at least one keyword related to the communication content from a predetermined keyword database or from an external electronic device.

7. The electronic device of claim 1, wherein the keyword acquisition unit is configured to obtain the at least one keyword through at least one of a speech to text (STT), metadata, and an image processing, when the communication content is non-text based contents.

8. The electronic device of claim 1, wherein the keyword acquisition unit is configured to obtain the at least one keyword from an area designated as a keyword detection area in the text-based content converted from the communication content.

9. The electronic device of claim 1, wherein the controller is configured to identify the at least one application corresponding to the at least one keyword through a keyword-application relation database (DB), and
the keyword-application relation DB is configured to manage and update a relationship between the at least one application and the at least one keyword.

10. The electronic device of claim 1, wherein when multiple applications corresponding to the at least one obtained keyword have been identified, the controller performs a priority analysis to determine a priority order among the multiple applications based on a frequency use of the multiple applications, displays the multiple applications according to the priority order, and selects one of the displayed multiple applications as the specific application according to a user's input.

11. The electronic device of claim 1, wherein when multiple keywords have been obtained and multiple applications corresponding to the multiple keywords have been identified, the controller performs a priority analysis to determine a priority order among the multiple applications based on a relatedness between the multiple keywords and the multiple applications, displays the multiple applications according to the priority order, and selects one of the displayed multiple applications as the specific application according to a user's input.

12. The electronic device of claim 1, wherein when the specific application is not stored in the electronic device, the controller is configured to download the specific application from a predetermined server for starting.

13. The electronic device of claim 1, wherein the controller is configured to output, via the display unit, an overlapping notification message when a control signal generated by the specific application overlaps with another control signal.

14. The electronic device of claim 1, wherein when the specific application is a schedule management application and a schedule generated by the schedule management application overlaps with another schedule, the controller is configured to output an overlapping notification message via the display unit.

15. The electronic device of claim 1, wherein when the specific application is a control application for controlling another electronic device, the controller is configured to output a notification message indicating whether or not a control signal generated by the control application has been successfully processed to control the another electronic device.

16. The electronic device of claim 1, wherein when the specific application is a memo application, the controller is configured to output, via the display unit, a notification message related to a memo of the communication content generated by the memo application.

17. The electronic device of claim 1, wherein the at least one available application includes at least one of an email application, a phone application, a chat application, a texting application, a map application, an address book application, or a schedule management application.

18. An electronic device comprising:
a keyword acquisition unit configured to obtain at least one keyword from a communication content, wherein the communication content has been converted into a text-based content including at least one text segment;
a controller configured:
  to identify at least one available application corresponding to the at least one keyword obtained by the keyword acquisition unit;
  to provide a first user interface for selecting a specific application among the at least one available application; and
  to provide a second user interface for verifying or editing a keyword content when the specific application is selected,
wherein the keyword content is automatically generated according to an execution of the specific application,
wherein before the keyword acquisition unit obtains the at least one keyword from the communication content, the controller opens one of a plurality of different applications provided in the electronic device based on a user's input and receives the communication content from which the at least one keyword is obtained, and
wherein after the opened one of the plurality of different applications is closed, the controller provides the first user interface for selecting the specific application and provides the second user interface for verifying or editing the keyword content when the specific application is selected; and
a display unit configured to display the verified or edited keyword content.

* * * * *